F. HENZELMANN.
RETAINER FOR BALL BEARINGS.
APPLICATION FILED AUG. 26, 1911.
1,034,111.
Patented July 30, 1912.
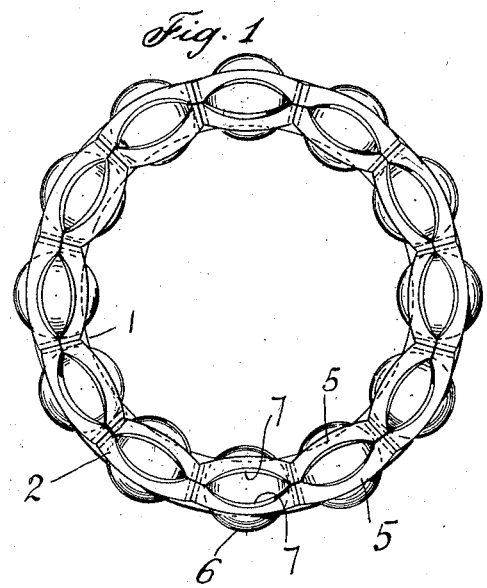
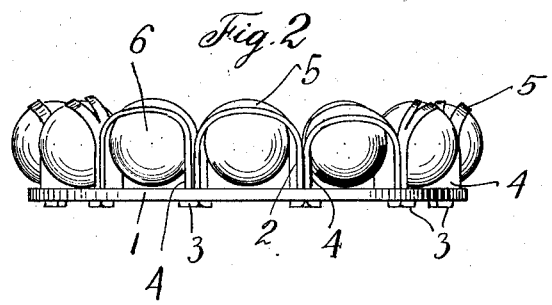
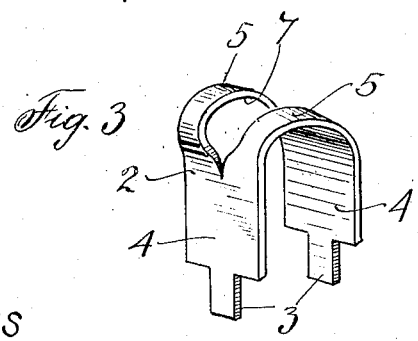
WITNESSES
Joseph Danziger
Joseph Schlenker
INVENTOR
Fritz Henzelmann
By Robt. Klotz
Atty.

UNITED STATES PATENT OFFICE.

FRITZ HENZELMANN, OF CHICAGO, ILLINOIS.

RETAINER FOR BALL-BEARINGS.

1,034,111.   Specification of Letters Patent.   Patented July 30, 1912.

Application filed August 26, 1911. Serial No. 646,200.

*To all whom it may concern:*

Be it known that I, FRITZ HENZELMANN, a citizen of the United States, and residing at Chicago, in the county of Cook and State of Illinois, have invented a new and useful Improvement in Retainers for Ball-Bearings, of which the following is a complete specification.

The main objects of this invention are to provide an improved retainer for ball bearings; to provide a retainer which will readily permit the fragments of a broken ball to fall from the bearing; to provide a retainer which is simple and durable in construction and of light weight; and to provide a retainer for ball bearings adapted to reduce the friction between the balls and the retainer to a minimum.

A specific embodiment of the invention is illustrated in the accompanying drawings, in which:

Figure 1 is a top plan view of the retainer with the balls therein. Fig. 2 is a side elevation of the same. Fig. 3 is a perspective view of one of the retainer plates.

In the construction shown, the retaining ring 1 is flattened in the plane of its radii, and is provided with a plurality of regularly spaced apertures in which the retainer plates 2 are secured. The retainer plates 2 each comprise a strip of relatively thin and strong metal which is bent to an approximately U-shaped form, and has its ends reduced in size to provide rivets 3 which extend through the apertures in the ring 1 and are turned over to secure the plates in place. The side or leg portions 4 of the plates lie in planes coinciding with the radii of the ring and the legs of each plate lie in close contact with the adjacent legs of the next adjacent plates, and each two contacting legs are secured in the same aperture in the ring. Each plate, therefore, has its two legs in circumferential alinement on the ring. The base or central portions of the plates extend circumferentially of the ring, and each is split longitudinally and spread to provide jaws 5 which are adapted to engage the balls 6 with their inner margins 7, thereby producing the least possible frictional contact between the plates and the balls.

Obviously a retainer for ball bearings constructed in accordance with this invention is of cheap and simple construction and its friction on the balls will be comparatively slight.

While but one specific embodiment of the invention has been herein shown and described it will be understood that many details of the construction shown may be varied or omitted without departing from the scope of the claims.

I claim:

1. A retainer for ball bearings, comprising a retaining ring having a plurality of apertures therethrough, and a plurality of U shaped plates arranged with the adjacent legs of adjacent plates in contact with each other and secured in the same aperture in the ring, said plates having their central portions split circumferentially of the ring and spread to provide jaws.

2. A retainer for ball bearings, comprising a retaining ring having a plurality of apertures therethrough, and a plurality of U shaped retainer plates secured on said ring with the legs of one plate in contact with those of the next adjacent plates, the central portions of said plates being slotted longitudinally of the ring and spaced to engage the balls with their inner margins.

In witness whereof I have hereunto subscribed my name in the presence of two witnesses.

FRITZ HENZELMANN.

Witnesses:
RICHARD A. SCHULTZ,
ROBT. KLOTZ.

---

Copies of this patent may be obtained for five cents each, by addressing the "Commissioner of Patents, Washington, D. C."